United States Patent
Wiberg et al.

(10) Patent No.: US 10,717,472 B2
(45) Date of Patent: Jul. 21, 2020

(54) EXTRUDED COMPONENT FLOOR STRUCTURE

(71) Applicant: The Knapheide Manufacturing Company, Quincy, IL (US)

(72) Inventors: John Wiberg, Quincy, IL (US); Manoj Patil, Quincy, IL (US); Justin Steele, Quincy, IL (US); Richard Baze, Quincy, IL (US); Lance Jones, Quincy, IL (US); Lance Gronewold, Quincy, IL (US)

(73) Assignee: Knapheide Manufacturing Company, Quincy, IL (US)

( * ) Notice: Subject to any disclaimer, the term of this patent is extended or adjusted under 35 U.S.C. 154(b) by 172 days.

(21) Appl. No.: 15/939,085

(22) Filed: Mar. 28, 2018

(65) Prior Publication Data

US 2019/0300075 A1    Oct. 3, 2019

(51) Int. Cl.
| | | |
|---|---|---|
| B62D 25/20 | (2006.01) | |
| B62D 33/02 | (2006.01) | |
| B62D 29/00 | (2006.01) | |
| B62D 27/02 | (2006.01) | |

(52) U.S. Cl.
CPC ....... *B62D 25/2054* (2013.01); *B62D 27/023* (2013.01); *B62D 29/008* (2013.01); *B62D 33/02* (2013.01)

(58) Field of Classification Search
CPC .......................... B62D 33/02; B62D 25/2054
USPC ............................................ 296/184.1, 183.1
See application file for complete search history.

(56) References Cited

U.S. PATENT DOCUMENTS

| | | | |
|---|---|---|---|
| 3,156,210 A | | 11/1964 | Lyon |
| 3,269,072 A | | 8/1966 | Black |
| 3,380,216 A | * | 4/1968 | Spence ................ B62D 33/046 |
| | | | 52/592.4 |
| 3,738,678 A | * | 6/1973 | King .................. B62D 25/2054 |
| | | | 52/656.8 |
| 3,899,152 A | | 8/1975 | Avery |
| 3,946,529 A | | 3/1976 | Chevaux |
| 4,186,537 A | | 2/1980 | Mountz |
| 4,947,595 A | | 8/1990 | Douds et al. |
| 4,951,992 A | * | 8/1990 | Hockney ............ B62D 25/2054 |
| | | | 105/422 |
| 5,170,605 A | * | 12/1992 | Huddle ..................... B60P 3/20 |
| | | | 52/588.1 |
| 5,351,990 A | * | 10/1994 | Thomas ............. B62D 25/2054 |
| | | | 280/789 |
| 5,613,339 A | | 3/1997 | Pollock |
| 5,791,714 A | * | 8/1998 | Hall, Jr. ............. B62D 25/2054 |
| | | | 296/184.1 |

(Continued)

*Primary Examiner* — Jason S Morrow
(74) *Attorney, Agent, or Firm* — Qpatents (57) ABSTRACT

A floor structure is assembled from a plurality of extruded aluminum planks that extend laterally across the bed of a truck floor positioned on an undercarriage of a center beam and cross beams. The planks each have one or more ribs on their underside to strengthen the floor structure and provide a mechanical means for connecting adjacent planks together. Each plank is configured with a female end rib and a male end rib that interlock to restrain movement relative the adjacent planks in all directions except the lateral direction. Side rails are attached to the floor structure at the edges of the plank bed to prevent movement of the planks in the lateral direction.

14 Claims, 6 Drawing Sheets

(56) References Cited

U.S. PATENT DOCUMENTS

| | | |
|---|---|---|
| 6,076,991 A | 6/2000 | Karlsen et al. |
| 6,082,810 A | 7/2000 | Bennett |
| 6,324,796 B1 | 12/2001 | Heath |
| 7,188,576 B2 | 3/2007 | Bogard et al. |
| 8,136,312 B2 | 3/2012 | Hallsten |
| 8,468,965 B2 | 6/2013 | Kor et al. |
| 9,234,357 B2 | 1/2016 | Dossche et al. |
| 9,399,492 B2 | 7/2016 | Booher |
| 9,695,601 B2 | 7/2017 | Whispell et al. |
| 2006/0070334 A1 | 4/2006 | Moser, III et al. |
| 2006/0087152 A1* | 4/2006 | Kuriakose .......... B62D 25/2054 296/184.1 |
| 2010/0313422 A1 | 12/2010 | Booher |
| 2011/0020589 A1* | 1/2011 | Kan ................... B62D 25/2054 428/83 |
| 2019/0193794 A1* | 6/2019 | Beet .................. B62D 25/2054 |

* cited by examiner

EXTRUDED COMPONENT FLOOR STRUCTURE

BACKGROUND

Technical Field

Various embodiments of the present invention relate to a structure for holding or hauling equipment and materials, and more specifically, to a truck body floor structure built from extruded components.

Description of Related Art

Considerable efforts towards increasing vehicle fuel mileage have been made over the past four decades. Part of this effort involved increasing the efficiency of gas and diesel engines. Another part of the effort to increase fuel mileage has involved the effort to decrease the weight of vehicles. To increase fuel mileage automobile manufacturers have reduced the weights of vehicles considerably through design changes and the use of new, lighter weight materials. The goal has been to adopt the new lighter weight materials and design changes—thus reducing vehicle weight-without sacrificing comfort, safety, roominess or utility. In many cases, however, one or more of these goals have been compromised in the effort to reduce vehicle weight and realize increases in fuel mileage.

A great number of vehicles produced today feature aluminum components in place of the heavier steel components used in previous years' models. Aluminum components do indeed reduce weight as compared to similar iron or steel components. However, aluminum tends to be more malleable than steel. Aluminum bends easier, and if bent, does not spring back to its original shape as well as a similarly shaped component of steel. But since aluminum weighs only about a third as much as steel, auto makers have replaced a great number of steel and iron parts with aluminum. For example, some auto makers use aluminum plate truck beds in pickup trucks, 18 wheelers, and various other types of trucks. While this yields considerable weight reduction, it sometimes results in structural problems within the truck bed over time or due to rough usage. Conventional aluminum plate truck beds can be punctured by heavy, jagged materials such as chunks of concrete. Heavy loads concentrated on a small surface area can cause depressions between the underlying support members in conventional aluminum plate truck beds.

BRIEF SUMMARY

The present inventors recognized a need for a truck bed made of aluminum components but less susceptible to puncture and structural deformity than conventional aluminum plate truck bed designs. The various embodiments disclosed herein meet this goal and provide other benefits and advantages as described in the following pages.

According to various embodiments disclosed herein a floor structure is constructed from a plurality of planks that extend in the lateral direction. Each of the planks has two or more ribs to strengthen the planks and provide a mechanical means of attaching adjacent planks. On one side of the plank a male rib is configured, and the other side has a female rib. The planks slide together to interlock, with the protuberance of one rib fitting in a receptacle configured in a rib on the adjacent plank. Interlocking the planks in this manner restrains movement in all directions except the lateral direction. Side rails are attached to the floor structure at the edges of the planks, restraining movement of the extruded planks in the lateral direction.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings.

DETAILED DESCRIPTION

Figure 1A:
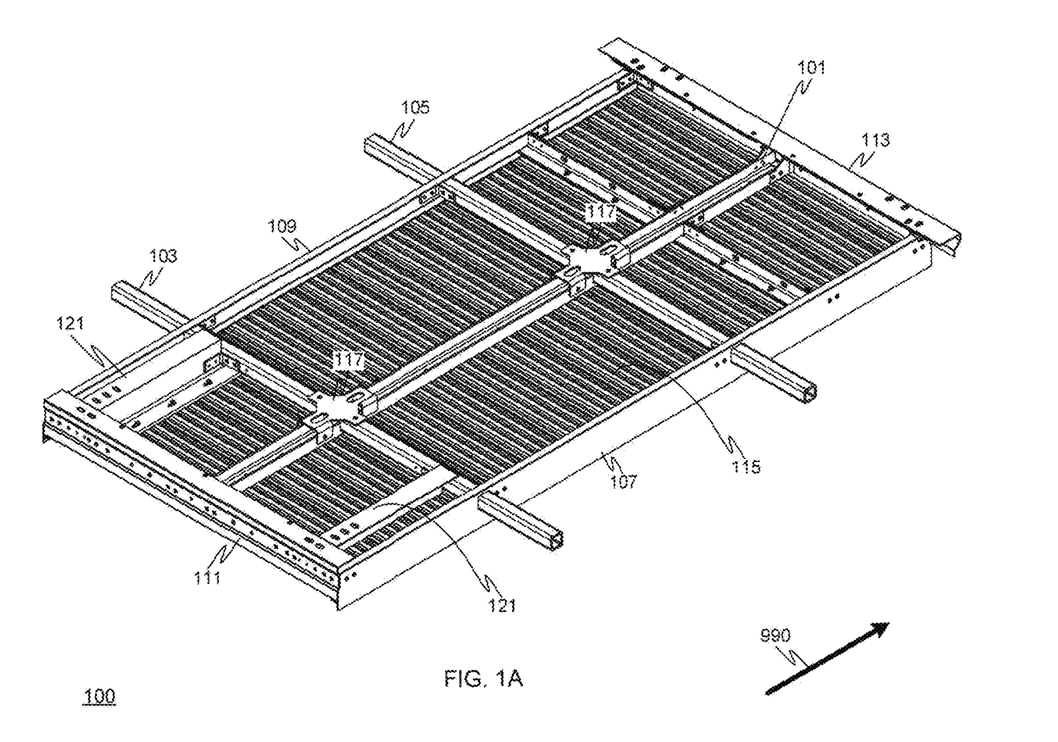
FIG. 1A depicts an oblique view of the bottom side view of a utility truck bed according to various embodiments disclosed herein.

FIG. 1A depicts an oblique view of the bottom side of a utility truck bed 100 according to various embodiments disclosed herein. The truck bed 100 may also be called a floor structure. For ease of discussing and explaining the truck bed 100 arrow 990 is providing pointing in the direction towards the front of the vehicle. The lateral direction, as used herein, means from side to side of the truck bed or floor structure. The truck bed 100 has an undercarriage that includes center beam 101 and cross beams 103-105. The center beam 101 is attached to each of the cross beams 103-105 with a cross brace component 117. In the embodiment depicted in FIGS. 1A-1B the cross beams 103-105 extend through holes in the side rails 107-109 on each lateral side by a distance sufficient for another component of the truck body—e.g., a sidepack utility truck tool cabinet. In other embodiments, for example, flat bed embodiments, the cross beams 103-105 do not extend through the side rails, and instead are affixed to the inner surface of side rails 107-109. In yet other embodiments the cross beams 103-105 are affixed to the bottom side of rails 107-109, and are either laterally flush with rails 107-109 (e.g., flatbed) or extend beyond the rails 107-109 (e.g., utility truck bed). Details of the center beam 101 and cross beams 103-105 are depicted in FIG. 2.

Figure 4A:
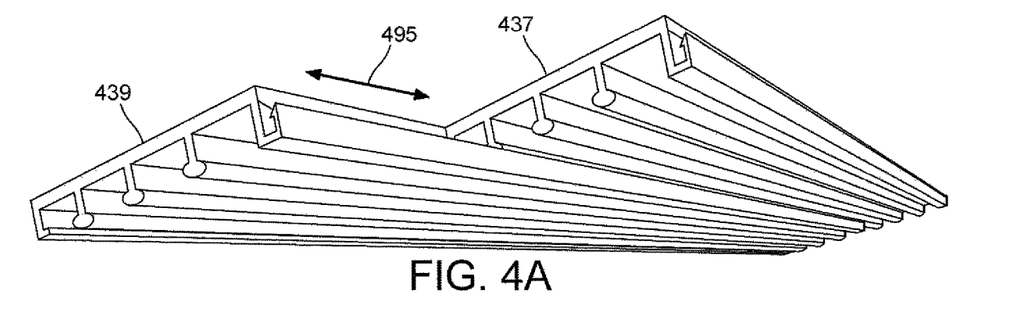
FIGS. 4A-B depict oblique views of two extruded truck body bed planks to illustrate how they fit together according to various embodiments disclosed herein.
Figure 4B:
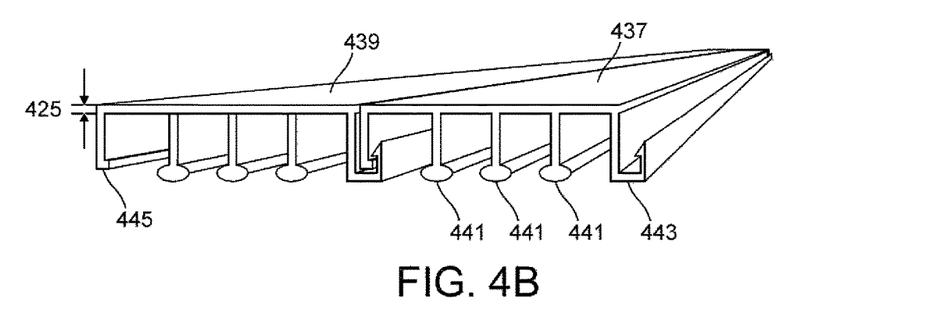
Figure 4C:
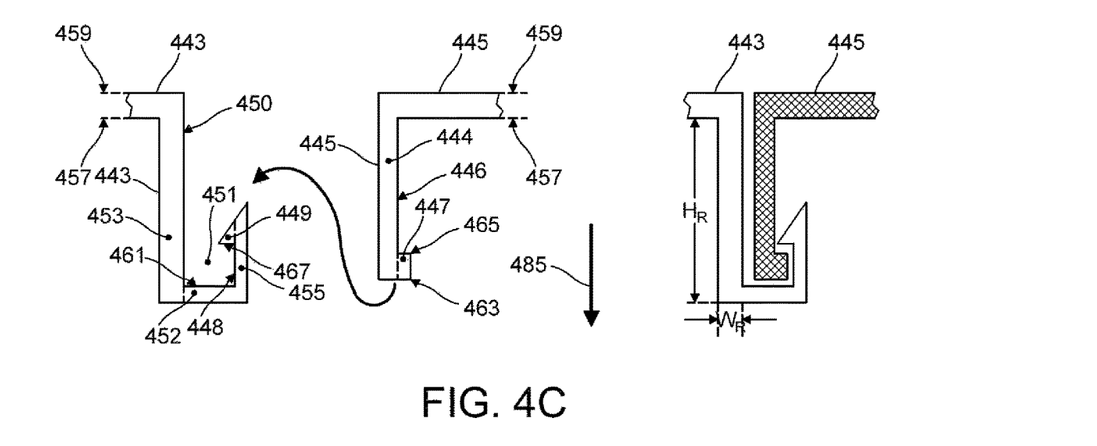
FIG. 4C depicts a cutaway end view of two ribs to illustrate the interlocking mechanism of the various embodiments disclosed herein.

The truck bed 100 has a bed constructed from extruded planks 115. Each extruded plank 115 is interlocked with the adjacent extruded plank 115. In the interlocked position the extruded planks 115 are restrained—that is, prevented from moving—in all directions except the lateral direction (side to side). The side rails 107 and 109 constrain movement of the extruded planks 115 in the lateral direction. Further details of the planks 115 are illustrated in FIGS. 4A-C. The rear rail 111 and front rail 113 are respectively fastened to the rear and front of truck bed 100. Two longitudinal back beams 121 aid in connecting the rear rail 111 securely to cross beam 103.

Figure 1B:
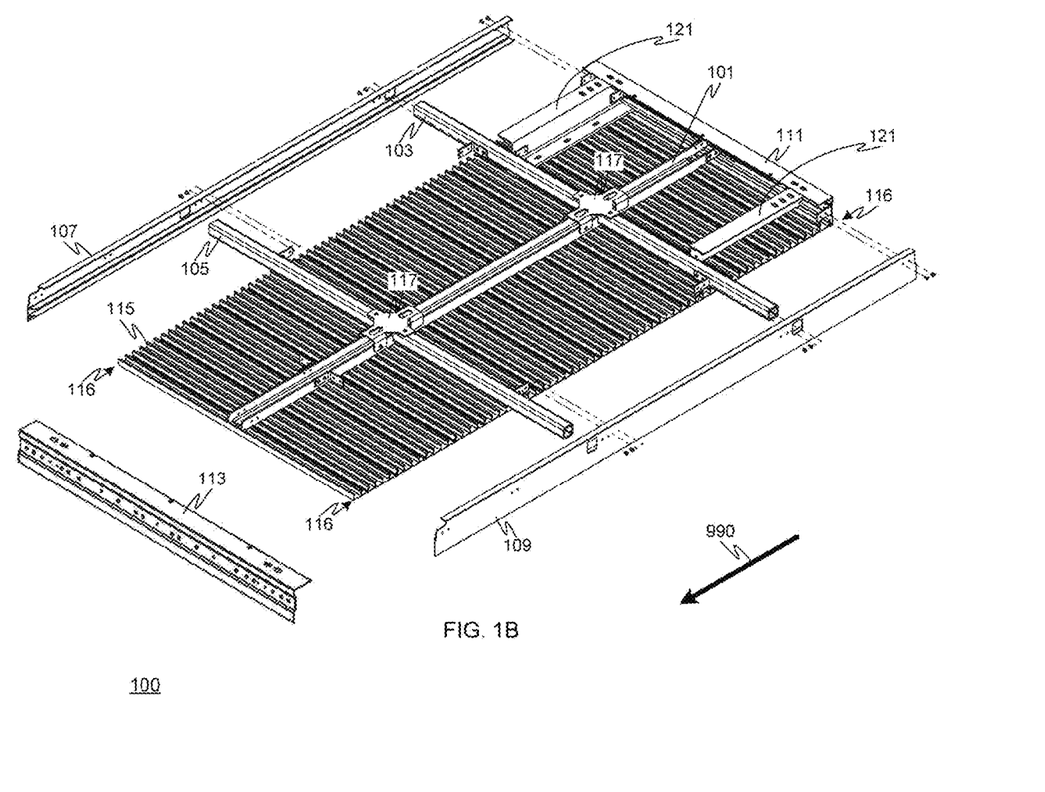
FIG. 1B depicts an exploded view of components of the utility truck bed of FIG. 1A.

FIG. 1B depicts an exploded view of components of the utility truck bed 100 of FIG. 1A. It should be noted that FIG. 1B depicts a view looking from the front towards the back so as to illustrate assembly of front rail 13. (Arrow 990 points towards the front of the vehicle.) Upon fabrication of the truck bed 100 the side rails 107 and 109 abut the interlocked extruded planks 115 at their edges 116 to be positioned adjacent the interlocked extruded planks 115 at their edges 116. This constrains movement of the plank components 115 in the lateral direction. Of course, by virtue of dimensional tolerances, in practice there may be a small amount of movement from side to side—from 1/64 of an inch up to as much as 5/8 of an inch. Thus, it may be more accurate to say that, upon being abutted by side rails 107 and 109 the plank components 115 are constrained from lateral movement rather than being entirely prevented from lateral movement. Upon assembly, various embodiments of the floor structure are substantially planar. Some embodiments, however, may have a bit of bow (or bend) designed into the profile from front to back as viewed from the side. For example, the floor structures of 18 wheeled flatbed trailers are typically designed with a bit of bow (or bend, curve) in them as viewed from the side.

Figure 2:
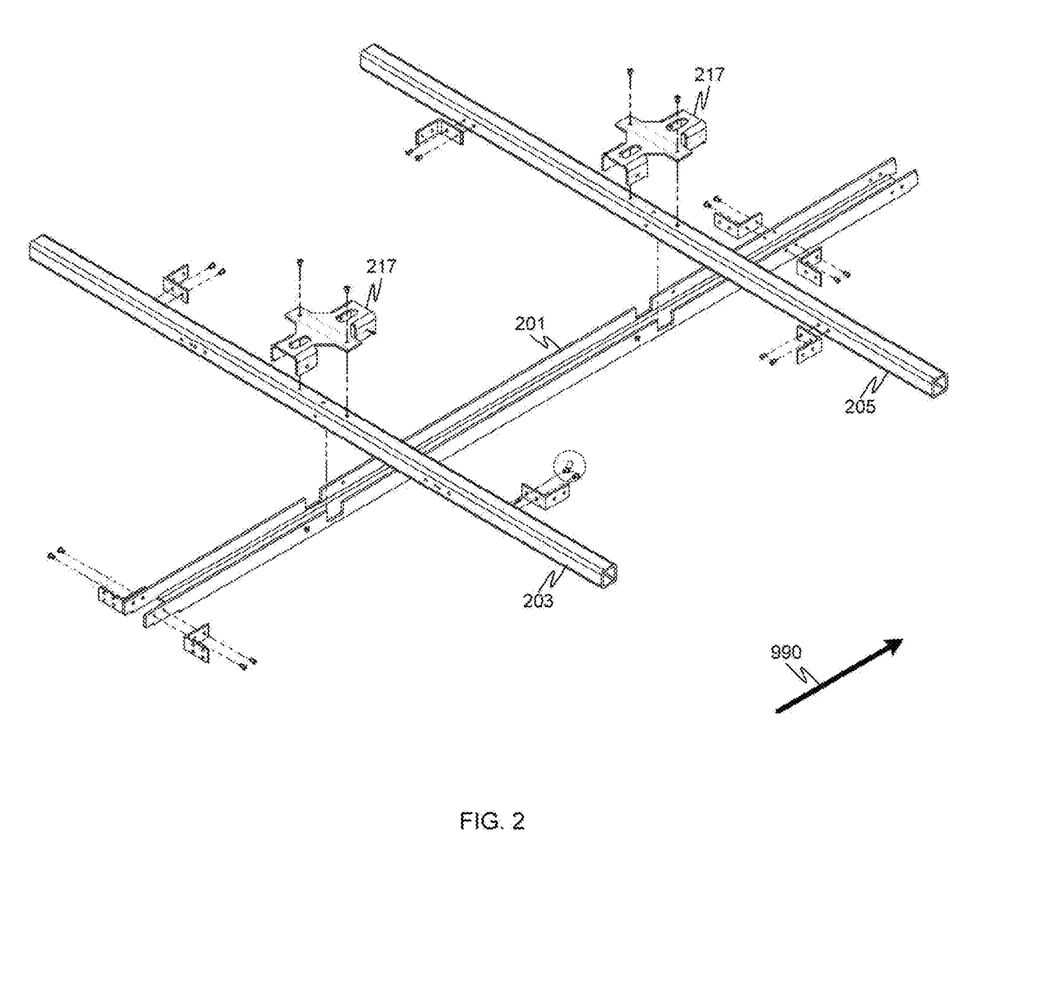
FIG. 2 depicts undercarriage frame components of a utility truck bed according to various embodiments disclosed herein.

FIG. 2 depicts undercarriage frame components of a utility truck bed according to various embodiments disclosed herein. As above in FIGS. 1A-B, the arrow 990 points in the direction towards the front of the vehicle. The truck bed undercarriage that includes center beam 201 and cross beams 203-205. The center beam 201 and cross beams 203-205 provide support for and strengthen the bed surface constructed from extruded planks 115 shown in FIGS. 1A-B. In some embodiments the extruded planks 115 may be fastened to one or more of the center beam 201 and/or cross beams 203-205. In other embodiments the extruded planks 115 may simply rest on the center beam 201 and cross beams 203-205 rather than being fastened to them.

The embodiments depicted in the figures have one center beam 201 and two cross beams 203-205. However, some embodiments may be configured with only one cross beam 203. Other embodiments may be configured with three or more cross beams. Truck beds that are wider, or require additional strength may be configured with two or more longitudinal beams similar to center beam 201.

In the embodiment depicted in the figure, center beam 201 is constructed from one piece with notches for the cross beams 203-205 to pass through. In other embodiments the center beam 201 may consist of two or more sections fastened together. In various embodiments the center beam 201 has a U shaped cross-section and the cross beams 203-205 have square or rectangular cross-sections. In other embodiments the center beam 201 and/or the cross beams 203-205 may have any of square, rectangular, circular, oval or U shaped cross-sections. In addition to providing support for and strengthening the extruded planks of the truck bed, the rear cross beam 203 also serves as an attachment point for the rear rail assembly. Details of the rear rail assembly are shown in FIG. 3.

Figure 3:
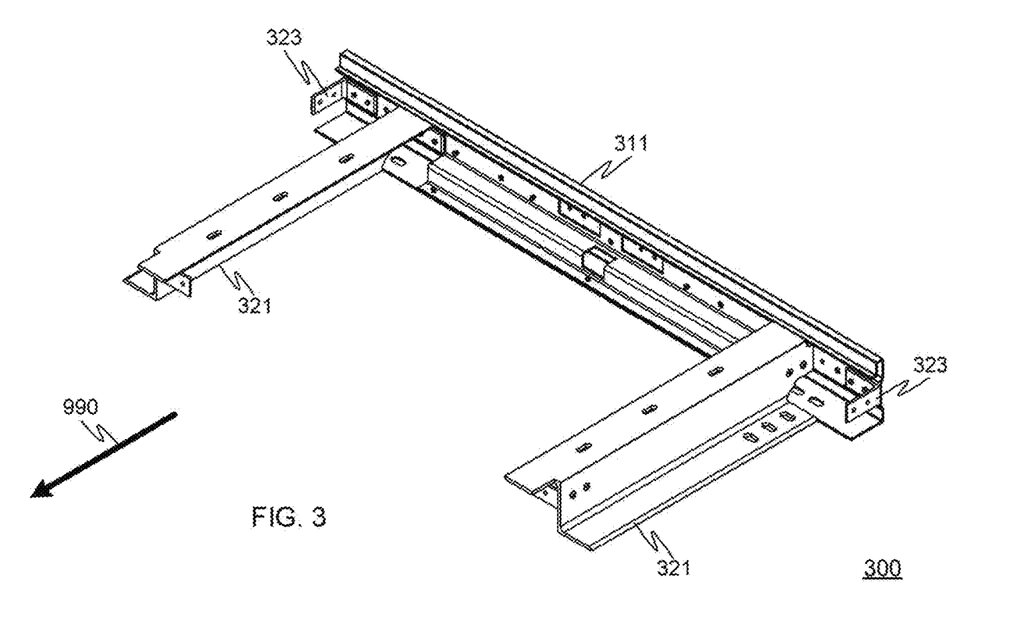
FIG. 3 is an oblique view depicting the rear rail assembly in accordance with various embodiments.

FIG. 3 is an oblique view depicting the rear rail assembly 300 in accordance with various embodiments. The rear rail assembly includes the rear rail 311 and longitudinal back beams 321. The rear rail 311 is connected to side rails 107-109 of FIGS. 1A-B. In various embodiments angle braces 323 connect the rear rail 311 to side rails. The longitudinal back beams 321 aid in connecting the rear rail 311 securely to the rear cross beam 103 to strengthen the truck bed in the longitudinal direction. In various embodiments the rear cross beam 103 may also be connected to one or more of the extruded planks at the rear of the truck bed, that is, extruded planks 115 shown in FIGS. 1A-B.

FIGS. 4A-C depict extruded truck body bed planks according to various embodiments disclosed herein (e.g., extruded planks 115 shown in FIGS. 1A-1B), FIG. 4A is an oblique view of two truck body bed planks illustrating how they fit together. In various embodiments the bed surface of the truck bed is constructed from extruded planks such as extruded planks 437-439. Each of the extruded planks is interlocked to the adjacent extruded plank in the truck bed. This restrains the planks 437 and 439, preventing movement in all directions except the lateral direction, side to side direction. FIG. 4A illustrates extruded planks 437 and 439 being slid together in the lengthwise direction 495. The lengthwise direction 495 of the planks is the same as the lateral direction with respect to the truck body 100 of FIGS. 1A-B.

The extruded planks of FIG. 4A are shown from beneath the truck bed, for illustrative purposes, looking up towards the ribs on the underside of each plank. The direction 485 shown in FIG. 4C is the downward direction with respect to an assembled truck bed mounted upon a truck. A plank's rib, in the present context, is a portion of the plank running lengthwise along the plank and extending vertically downward from the underside of the plank. In some embodiments the ribs may run the full length of the plank, while in other embodiments the ribs, or some of the ribs, may only run a portion of the plank's length. In various embodiments ribs are formed on the underside of each plank. By "formed on" it is meant that the ribs may be formed from the same piece of material that the planks are made from (e.g., by extrusion or machining), or may be made separately and fastened onto the underside of the plank. A rib suitable for interlocking typically has a rib body width (thickness) that is considerably less than the height of the rib. This can be seen in FIG. 4C where $H_R$ is the rib height of the rib 443 and $W_R$ is its rib body width. In various embodiments the rib height $H_R$ is at least 3.0 times greater than the rib body width $W_R$. Another way of saying this is that: $H_R \geq 3 \times W_R$. In other embodiments the rib height $H_R$ to rib body width $W_R$ relationship is: $H_R \geq 2 \times W_R$; or $H_R \geq 2.5 \times W_R$; or $H_R \geq 4 \times W_R$; or $H_R \geq 5 \times W_R$; or $H_R \geq 10 \times W_R$; or $H_R \geq 20 \times W_R$; or any range or value in between or within these ranges.

Extruded planks 437-439 each have one or more center ribs 441 that extend in the downward direction 485 from the underside of the truck bed. The embodiment of FIGS. 4A-B shows extruded planks with three center ribs 441. Some embodiments have only one center rib 441 while other embodiments may have two, four, five or more center ribs 441. One embodiment has no center ribs-instead being configured with a U shaped cross-section having one end rib 443 and another end rib 445. The center ribs 441 help to strengthen the truck bed 100, enabling the truck bed to carry more weight and resist punctures. Increasing the thickness of the ribs helps to increase the strength and load capacity of the truck bed 100. Increasing the floor thickness 425 also strengthens the truck bed floor and aids in preventing punctures.

FIG. 4C depicts a cutaway end view of end ribs 443 and 445 to illustrate the interlocking mechanism of the various embodiments disclosed herein. End rib 445 may be called a male end rib. End rib 443 may be called a female end rib. End ribs 443 and 445 each have a floor surface 459 that, upon being assembled with the other floor planks, becomes part of the truck bed floor. End ribs 445 and 443 each also have a subfloor surface 457. In some embodiments the subfloor surface 457 is planar to the floor surface 459. The rib body 444 of end rib 445 extends in the downward direction 485 from the subfloor surface 457. Rib body 444 has an inner surface 446. A protuberance 447 extends from the rib body 444. The protuberance 447 has a top surface 465.

The female rib 443 has a rib body 453 that extends downward from its subfloor surface to a rib bottom 452. The rib bottom 452 may either be attached to the rib body 453 or may be formed from (or machined from) the same piece of material as the rib body 453, e.g., the same piece of metal. A capture panel 455 extends upward from the rib bottom 452 which itself is firmly affixed to rib body 453 (or formed from the same piece as it). Hence, the capture panel 455 is securely fastened to the rib body 453 since it extends upward from a portion of the female rib 443, that is, upward from the rib bottom 452. In some embodiments the surface 448 of the capture panel 455 is planar parallel to the opposing surface of rib body 453. In other embodiments capture panel 455 and/or the surface 448 are may not be planar and/or may not be parallel with respect to the surface of the rib body 453. For example, the rib body 453 may be tapered slightly so the upper end near the underside of the floor is thicker than the lower end near the rib bottom 452. The capture panel 455 may have a flat surface, a curved surface or have other surface shape profiles known to those of ordinary skill in the art. In various embodiments the capture panel 455 opposes the surface of rib body 453, regardless of whether it's planar or parallel. That is, the surface of capture panel 455 faces (opposes) the surface of rib body 453 so as to restrain movement of the male rib 445 upon being interlocked within the receptacle 451 of female rib 443.

The capture panel 455 includes a lip 449. The lip 449 extends inward towards the rib body 453 from the capture panel 455. The lip 449 of the female rib 443 has a bottom surface 467. The parts of the female rib 443 form a receptacle 451 disposed to receive the rib body 444 and protuberance 447 of male rib 445. The receptacle 451 is formed by rib body 453, rib bottom 452 and capture panel 455. More particularly, the receptacle 451 is formed by the surface 450 of rib body 453, the top surface 461 of rib bottom 452, and the inner surface 448 of the capture panel 455. The bottom surface 467 of female lip 449 fits on the top surface 465 of male protuberance 447. Sliding the protuberance 447 of rib 445 into the receptacle 451 of rib 443 interlocks the two adjacent ribs, preventing movement in all directions except the lengthwise direction 495 (FIG. 4A) of the planks, that is, the lateral direction or side-to-side direction of the truck bed. In this way the capture panel 455 captures the protuberance 447 of rib 445, thus interlocking the planks and restraining movement in all directions except the lateral direction. Upon being assembled into a truck bed, movement in the lengthwise direction 495 of the planks is prevented by the side rails 107 and 109 shown in FIGS. 1A-B.

Figure 5:
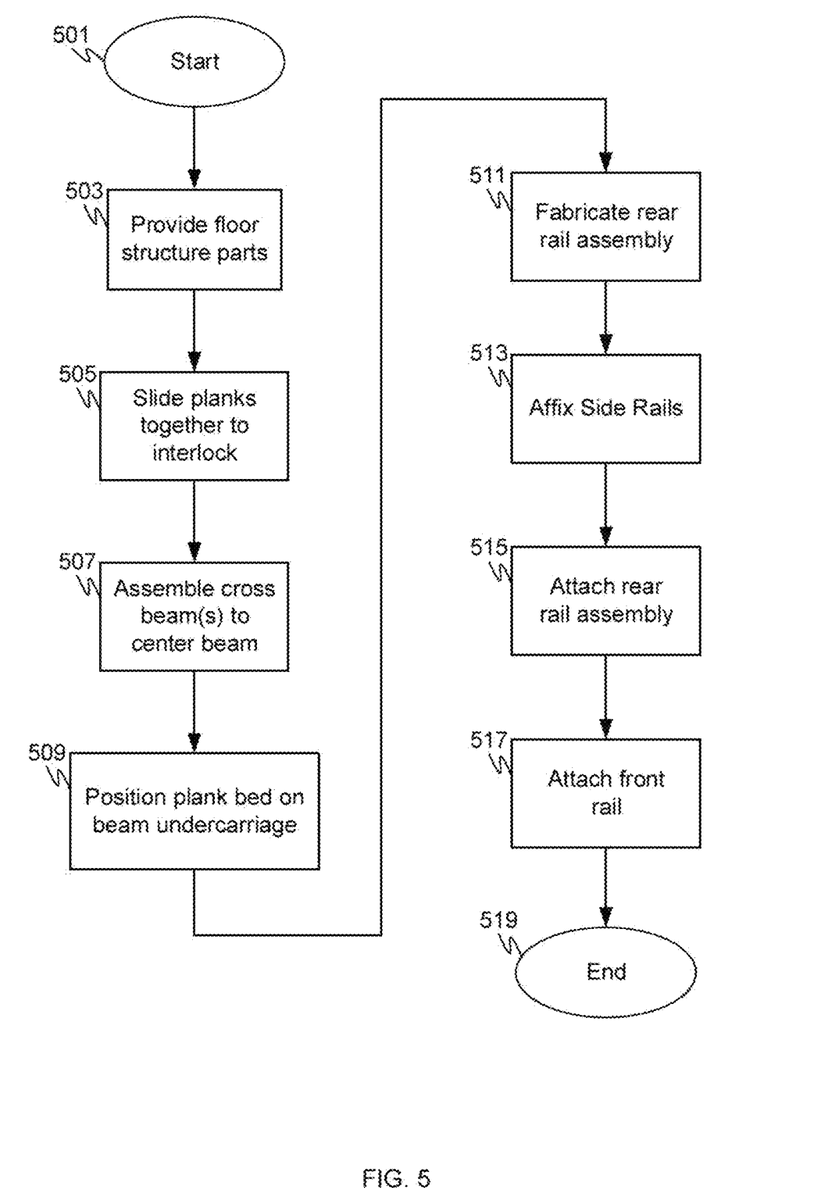
FIG. 5 is a flowchart illustrating a method of assembling a floor structure according to various embodiments of the invention.

FIG. 5 is a flowchart illustrating a method of assembling a floor structure according to various embodiments of the invention. The method begins in block 501 and proceeds to block 503 where the component parts of the floor structure are gathered together. It may be that various components and assemblies of the floor structure are manufactured at different places and at different times. In some embodiments the entire assembly process need not take place at one particular location. For example, in some implementations it may be the case that the extruded planks are assembled together into a floor portion in one location, and then shipped to another location for assembly with the rest of the component parts. Nonetheless, at some point all the component parts must be gathered together for assembly at some point, at least by the time the final assembly takes place.

Upon providing all the component parts of the floor structure in block 503 the method proceeds to block 505 to fasten the extruded planks together to form the truck bed floor. This is done by sliding the extruded planks together to interlock them, thus forming the floor portion of the structure. Once the extruded planks have been slid together in block 505 the method proceeds to block 507 to assemble the cross beams. The cross beams serve as an undercarriage for the truck bed, providing support and structural strength. Various embodiments include a center beam and two cross beams, for example, as shown in FIGS. 1A-B. Other embodiments may be configured with differing numbers of longitudinal beams (e.g., the center beam) and/or cross beams. The center beam and cross beams are connected to each other, for example, using a cross brace component fastened with screws, rivets and/or adhesive or other mechanical or adhesive attachment means. Once the cross beams have been attached to the center beam the method proceeds to block 509.

In block 509 the assembled bed of extruded planks is positioned on the undercarriage of cross beams and center beam. In some embodiments one or more of the planks may be attached to the undercarriage—e.g., the center beam—using screws, rivets and/or adhesives, or other such mechanical attachment means or adhesive attachment means. Once the planks are positioned upon the undercarriage the method proceeds to block 511. In various embodiments two longitudinal back beams are used to connect the rear rail securely to the rear cross beam. In block 511 the rear rail assembly is put together by attaching two or more longitudinal back beams to the rear rail. Upon completing the rear rail assembly in block 511 the method proceeds to block 513.

In block 513 the side rails are affixed to the other assembled components. Typically this entails attaching the side rails to the cross beams using a bracket and either screws or rivets or other such mechanical attachment means or adhesive attachment means. The side rails may also be connected to one or more extruded plank either directly or using a bracket for attachment. Upon connecting the side rails in block 513 the method proceeds to block 515 for attachment of the rear rail assembly. In some embodiments, rather than assembling the rear rail assembly separately, the components of the rear rail assembly depicted in FIG. 3 may be assembled piecemeal onto the side rails and assembled floor planks. In either case the longitudinal back beams are typically connected to the rear cross beam to strengthen the floor assembly in the longitudinal (front to back) direction.

Upon attaching the rear rail assembly to the floor structure the method proceeds to block 517 for attachment of the front rail. In various embodiments the front rail is attached to the side rails and center beam using angle brackets in conjunction with screws, rivets, adhesive or other such mechanical attachment means or adhesive attachment means. After attaching the front rail and all other components of the floor structure, the method proceeds to block 519 and ends.

The drawings and/or block diagrams in the figures help to illustrate the design characteristics, architecture and operation of various implementations of the systems disclosed herein. The flowchart and method steps in the figures help to illustrate assembly and operation of the apparatus, according to various embodiments. In this regard, each block in the flowchart or block diagrams may represent a step, an act or a function that comprises one or more activities or actions for implementing the various embodiments. It should also be noted that, in some alternative implementations, the activities noted in a block, or discussed in relation to a block, may occur in an order other than that depicted in the figures, or may be executed substantially concurrently. For example, the assembly of the cross beams in block 507 may take place before the extruded planks are interlocked together in block 505, or the front rail attachment of block 517 may take place after block 509. Various permutations of the order of activities other than that illustrated in the figure are known to those of ordinary skill in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes," "including" and/or "with" used in this specification specify the presence of stated features, integers, steps, operations, elements, and/or components, but do not preclude the presence or addition of one or more other features, units, steps, operations, elements, components, and/or groups thereof. The terms "obtaining" and/or "providing", as used herein and in the claims, may mean either retrieving an item or receiving it from another person, user or business entity. The term "plurality", as used herein and in the claims, means two or more of a named element. It should not, however, be interpreted to necessarily refer to every instance of the named element in the entire device—particularly, if there is a reference to "each" element of a "plurality" of elements. There may be additional elements in the entire device that are not be included in the "plurality" and are not, therefore, referred to by "each."

For ease and accuracy in describing the various embodiments the directional terms "up" (and "upward") and "down" (and "downward") are used in this disclosure. These terms refer to the directions as viewed from the perspective of looking towards a truck configured with an embodiment of the extruded component floor structure sitting on a road. The road is "down" under the truck. The sky is "up" above the truck. The term "lateral" means from side to side, that is, left to right. The "lateral direction" is the direction extending from side to side. The lateral direction of a truck bed extends from the driver's side to the passenger's side, and vice versa. Something positioned laterally adjacent to a component is positioned adjacent the component on either the left side or the right side. A "lateral edge" is a side edge of the component, not a top or bottom edge. The terms "front" and "back" are used in this disclosure is explaining the various features of the truck bed floor structure. Typically, the cab of a truck is positioned in front of the truck bed. However, some specialized vehicles may be constructed with a truck bed or platform in ahead of the truck's cab. In such instances the terms "front" and "back" may be reversed in the description of truck bed floor structures for specialized vehicles with the bed positioned ahead of the cab.

The interlocking of adjacent extruded planks is said to "restrain" movement of the planks in all directions except the lateral direction (side to side). In various embodiments the extruded planks in a floor structure are not bonded or welded together. Rather they are interlocked by sliding the planks together as shown in FIGS. 4A-C. Thus, although interlocking the planks prevents them from movement in all but the lateral direction, there is some small amount of play (movement) in the planks. Accordingly, the term "restrain" as used herein for interlocked planks having restrained movement means that the planks cannot move a distance greater than one half a rib body width $W_R$ in any direction except the lateral direction. By contrast, the side rails may allow a bit more plank movement in the lateral direction than the interlocking mechanism allows in other directions. The side rails are said to "constrain" movement of the extruded planks in the lateral direction. Since, in various embodiments, the extruded planks are not directly fastened to the side rails there may be some small amount of lateral movement even though the movement is constrained. Accordingly, the term "constrain" as used herein for lateral movement of planks constrained by the side rails means that the planks cannot move more than one third of a rib height $H_R$ in the lateral direction.

The terms "substantially planar" and the phrase "in substantially the same plane" mean that the specified surfaces of the components are flat with respect to each other within the practical limits of human construction standards. It would be impossible for two man-made metal components to be exactly planar in a mathematical sense. Therefore, for the purposes of this disclosure four points are to be considered "substantially planar" or "in substantially the same plane" so long as none of the four points are outside of the mathematical plane defined by the other three points by more than plus/minus 2.5% of the furthest distance to any of the other three points. In regards to the disclosed embodiments, the extruded plank at the front of the floor structure and the extruded plank at the rear of the floor structure are substantially planar to the right and left side rails.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and gist of the invention. The various embodiments included herein were chosen and described in order to best explain the principles of the invention and the practical application, and to enable others of ordinary skill in the art to understand the invention for various embodiments with various modifications as are suited to the particular use contemplated.

What is claimed is:
1. A floor structure, comprising:
  a plurality of planks extending in a lateral direction, the plurality of planks including a first plank and a second plank;
  a first plurality of ribs configured on the first plank and extending in the lateral direction, the first plurality of ribs comprising a first rib;
  a protuberance configured on the first rib;
  a second plurality of ribs configured on the second plank and extending in the lateral direction, the second plurality of ribs comprising a second rib, the second rib having a second rib body;
  a receptacle configured as part of the second rib;
  a capture panel configured as part of the second rib; and
  a lip configured as part of the second rib extending inward from the capture panel;
  wherein the receptacle is disposed to receive a portion of the first rib, including the protuberance, to interlock the first plank and the second plank in an interlocked position;

wherein in the interlocked position a bottom surface of the lip fits on a top surface of the protuberance; and wherein the protuberance of the first plank fits between the capture panel and the second rib body in the interlocked position.

2. The floor structure of claim 1, wherein the second plurality of ribs are characterized by a rib height at least 2.5 times greater than a rib body width.

3. The floor structure of claim 1, wherein the first plurality of ribs are formed to extend vertically on an underside of the first plank; and wherein the second plurality of ribs are formed to extend vertically on an underside of the second plank.

4. The floor structure of claim 1, wherein interlocking the first plank with the second plank restrains movement of the first plank relative to the second plank in all directions except the lateral direction.

5. The floor structure of claim 1, further comprising:
at least one first center rib configured as part of the first plank; and
at least one second center rib configured as part of the second plank.

6. The floor structure of claim 1, further comprising:
a left side rail fastened to the floor structure adjacent a first lateral edge of the plurality of planks; and
a right side rail fastened to the floor structure adjacent a second lateral edge the plurality of planks.

7. The floor structure of claim 6 configured as a truck bed, wherein the left side rail and the right side rail constrain motion of the plurality of planks in the lateral direction.

8. The floor structure of claim 7, further comprising:
a front plank among the plurality of planks; and
a rear plank among the plurality of planks;
wherein the front plank, the rear plank, the right side rail and the left side rail are substantially planar.

9. A method of assembling a floor structure comprising:
providing a plurality of planks extending in a lateral direction, the plurality of planks including a first plank with a first rib and a second plank with a rib, wherein the second rib has a second rib body;
aligning a portion of the first rib to fit within a receptacle configured as part of the second rib; and
sliding the portion of the first rib in the lateral direction into the receptacle of the second rib to interlock the first plank to the second plank in an interlocked position;
configuring a capture panel as part of the second rib;
providing a lip as part of the second rib extending inward from the capture panel;
wherein the portion of the first rib includes a protuberance configured to fit within the receptacle of the second rib;
wherein in the protuberance of the first plank fits between the capture panel and the second rib body in the interlocked position; and
wherein in the interlocked position a bottom surface of the lip fits on a top surface of the protuberance.

10. The method of claim 9, wherein the second plurality of ribs are characterized bby a rib height at least 2.5 times greater than a rib body width;
wherein the first plurality of ribs are formed to extend vertically on an underside of the first plank; and
wherein the second plurality of ribs are formed to extend vertically on an underside of the second plank.

11. The method of claim 9, further comprising:
restraining movement of the first plank relative to the second plank in all directions except the lateral direction by interlocking the first plank with the second plank.

12. The method of claim 9, further comprising:
configuring the first rib to have at least one first center plank; and
configuring the second rib to have at least one second center plank.

13. The method of claim 9, further comprising:
fastening a left side rail to the floor structure adjacent a first lateral edge of the plurality of planks; and
fastening a right side rail fastened to the floor structure adjacent a second lateral edge the plurality of planks;
wherein the left side rail and the right side rail constrain motion of the plurality of planks in the lateral direction.

14. The method of claim 9, further comprising:
attaching a front plank among the plurality of planks;
attaching a rear plank among the plurality of planks;
configuring the floor structure as a truck bed;
wherein the front plank, the rear plank, the right side rail and the left side rail are substantially planar.

* * * * *